United States Patent
Kim

(10) Patent No.: US 10,841,568 B2
(45) Date of Patent: Nov. 17, 2020

(54) METHOD AND DEVICE TO VISUALIZE IMAGE DURING OPERATION OF RIDE IN AMUSEMENT PARK AND METHOD AND DEVICE TO MANAGE CORRESPONDING DEVICE

(71) Applicant: Samsung C&T Corporation, Seoul (KR)

(72) Inventor: Min Hyuk Kim, Yongin-si (KR)

(73) Assignee: Samsung C&T Corporation, Seoul (KR)

( * ) Notice: Subject to any disclaimer, the term of this patent is extended or adjusted under 35 U.S.C. 154(b) by 0 days.

(21) Appl. No.: 16/533,927

(22) Filed: Aug. 7, 2019

(65) Prior Publication Data
US 2020/0177871 A1    Jun. 4, 2020

(30) Foreign Application Priority Data

Nov. 30, 2018    (KR) .................. 10-2018-0152636

(51) Int. Cl.
| | |
|---|---|
| *H04N 13/383* | (2018.01) |
| *H04N 13/344* | (2018.01) |
| *H04N 21/262* | (2011.01) |
| *H04N 21/6332* | (2011.01) |
| *H04N 21/81* | (2011.01) |
| *H04N 21/414* | (2011.01) |

(52) U.S. Cl.
CPC ......... *H04N 13/383* (2018.05); *H04N 13/344* (2018.05); *H04N 21/26258* (2013.01); *H04N 21/41407* (2013.01); *H04N 21/6332* (2013.01); *H04N 21/816* (2013.01)

(58) Field of Classification Search
None
See application file for complete search history.

(56) References Cited

U.S. PATENT DOCUMENTS

| | | | |
|---|---|---|---|
| 7,392,097 B2 | 6/2008 | Schweizer et al. | |
| 2016/0346704 A1* | 12/2016 | Wagner | ................. G06T 19/006 |
| 2017/0072316 A1* | 3/2017 | Finfter | .................... A63F 13/26 |
| 2017/0345198 A1* | 11/2017 | Magpuri | ................ A63G 31/16 |
| 2018/0253905 A1* | 9/2018 | McCracken | .......... A63F 13/211 |
| 2019/0004598 A1* | 1/2019 | Gordt | ..................... G06F 3/011 |

FOREIGN PATENT DOCUMENTS

| | | |
|---|---|---|
| JP | 2016153899 A | 8/2016 |
| KR | 20150079005 A | 7/2015 |
| KR | 101807601 B1 | 12/2017 |
| KR | 20180017736 A | 2/2018 |

OTHER PUBLICATIONS

Office Action; Korean Patent Application No. 10-2018-0152636; dated Jan. 16, 2020; Korean Intellectual Property Office: Daejeon, Korea.

* cited by examiner

*Primary Examiner* — Sath V Perungavoor
*Assistant Examiner* — Tyler B Edwards
(74) *Attorney, Agent, or Firm* — Stevens & Showalter LLP

(57) ABSTRACT

Provided are a method and device to visualize an image during an operation of a ride, and a method and device to manage the image visualizing device. The image visualizing device determines a sight direction with respect to a user terminal worn by a user, determines a moving direction of a ride which the user is on, and provides the user with a field of view (FOV) image determined from a contents image based on the sight direction and the moving direction.

18 Claims, 17 Drawing Sheets

Contents list — 1310

| Order | Type | Title | Duration (sec) | Volume (0-15) | Motion (0-20) |
|---|---|---|---|---|---|
| 1 | Image ˅ | Intro.jpg | 2 | 0 | 0 |
| 2 | Hold ˅ | Hold | 0 | 0 | 0 |
| 3 | Video ˅ | 170424_dynamic_everland_5.1.mp4 | 363 | 13 | 1 |
| 4 | 3D ˅ | HorrorMaze_VR_Final_Sound_RL.mp4 | 393 | 12 | 3 |
| 5 | Video ˅ | 170313_T-Express_final.mp4 | 213 | 12 | 2 |
| 6 | Image ˅ | Outro.jpg | 5 | 0 | 0 |
| 7 | Video ˅ | 360_Intro.mp4 | 40 | 10 | 1 |
| 8 | Video ˅ | 160721_megastorm(CBR80).mp4 | 107 | 10 | 1 |
| 9 | Video ˅ | 170313_safari_final.mp4 | 269 | 10 | 1 |
| 10 | Video ˅ | 170313_lost.mp4 | 295 | 10 | 1 |
| 11 | Video ˅ | 170313_Thunderfalls_final.mp4 | 328 | 10 | 1 |
| 12 | Video ˅ | 161117_dynaminc_everland_final.mp4 | 363 | 10 | 1 |

1320 — [ + ] [ − ] [ < ] [ > ]

Web server setting

Warning options

| Enable | ✓ |  |
|---|---|---|
| Warning battery | 20 | % |
| Warning temperature | 47 | °C |

[ Default ]  [ Save & Exit ]  [ Cancel & Exit ]

METHOD AND DEVICE TO VISUALIZE IMAGE DURING OPERATION OF RIDE IN AMUSEMENT PARK AND METHOD AND DEVICE TO MANAGE CORRESPONDING DEVICE

CROSS-REFERENCE TO RELATED APPLICATION(S)

This application claims the benefit of Korean Patent Application No. 10-2018-0152636, filed on Nov. 30, 2018, in the Korean Intellectual Property Office, the disclosure of which is incorporated herein by reference.

BACKGROUND

1. Field

One or more example embodiments relate to technology that provides a virtual reality (VR) on a ride operated in an amusement park.

2. Description of the Related Art

An amusement park or a theme park may have various entertainment attractions and amuse customers visiting the amusement park. For example, the attractions may include ride attractions which a user may ride on.

A ride attraction may be an attraction configured such that a vehicle which a user is on may move along a predetermined track or in freedom.

With the recent development of virtual reality (VR), there is a desire for technology that provides VR in an attraction provided in an amusement park.

SUMMARY

An aspect provides a user terminal that may provide a user with a contents image in view of both a sight direction of the user and a moving direction of a ride.

An aspect provides a user terminal that may adjust a speed and a frequency of applying a change in a final gaze direction depending on settings.

An aspect provides a user terminal that may be set as a normal terminal which measures a sight direction or a master terminal which measures a moving direction depending on master mode settings.

An aspect provides a master terminal that may provide a moving direction to user terminals designated as the same group.

An aspect provides a management server that may collect and visualize state information of user terminals.

An aspect provides a management server that may manage playing operations of user terminals all at once.

According to an aspect, there is provided a method of visualizing an image during an operation of a ride, the method including determining a sight direction with respect to a user terminal worn by a user, determining a moving direction of a ride which the user is on, and providing the user with a field of view (FOV) image determined from a contents image based on the sight direction and the moving direction.

The providing may include arranging the contents image based on the moving direction, determining the FOV image corresponding to a direction difference between the sight direction and the moving direction from the arranged contents image, and visualizing the determined FOV image.

The arranging may include matching a reference point of the contents image to the moving direction.

The determining of the FOV image may include calculating a final gaze direction of the user based on the direction difference between the sight direction and the moving direction, and determining the FOV image corresponding to the calculated final gaze direction from the arranged contents image.

The method may further include storing direction data detected at a time of departure of the ride, by a direction detection sensor configured to detect at least one of the sight direction and the moving direction, and calibrating the direction detection sensor based on the stored direction data.

The determining of the moving direction may include detecting the moving direction through a direction detection sensor, in response to a master mode being activated in the user terminal, and transmitting the detected moving direction to another user terminal in which the master mode is deactivated.

The determining of the sight direction may include detecting the sight direction through a direction detection sensor, in response to a master mode being deactivated in the user terminal, and the determining of the moving direction may include receiving the moving direction from another user terminal in which the master mode is activated.

A plurality of user terminals may be classified into one or more groups, and the determining of the moving direction may include receiving, by a target user terminal among the plurality of user terminals, the moving direction from another user terminal designated for a group of the target user terminal, among user terminals in which a master mode is activated.

The providing may include gradually applying a variation in at least one of the sight direction and the moving direction to a final gaze direction of the user based on a preset weight, in response to a change in the at least one direction, and providing the user with the FOV image corresponding to the final gaze direction to which the variation is applied.

The providing may include updating a final gaze direction, in response to a variation in the moving direction exceeding a threshold angle change.

According to an aspect, there is provided a user terminal for visualizing an image during an operation of a ride, the user terminal including a processor configured to determine a sight direction with respect to a user terminal worn by a user and a moving direction of a ride which the user is on, and a display configured to provide the user with an FOV image determined from a contents image based on the sight direction and the moving direction.

According to an aspect, there is provided a method of managing an image visualizing device associated with a ride, the method including building communication between a management server and user terminals providing a contents image based on a sight direction of a user and a moving direction of a ride, and instructing the user terminals for which the communication with the management server is built to play the contents image based on a contents playlist, in response to an input from a manager.

The instructing may include transmitting a time setting signal to the user terminals, synchronizing operation clocks of user terminals receiving the time setting signal based on time information received from the user terminals, and instructing the user terminals to play the contents image when a preset time elapses after the synchronization is completed.

The instructing may include receiving the sight direction from each of the user terminals, receiving the moving direction from a user terminal in which a master mode is activated, among the user terminals, determining a final gaze direction of a user with respect to each user terminal in which the master mode is deactivated, among the user terminals, based on the sight direction and the moving direction, and providing the user terminal in which the master mode is deactivated with an FOV image corresponding to the determined final gaze direction in the contents image.

The instructing may include instructing the user terminals to visualize a contents image selected from a plurality of contents images included in the contents playlist based on an event duration of the ride.

The method may further include changing at least one of an order of contents images included in the contents playlist, a visualizing scheme, a length of time, a volume, and the number of contents images, in response to an input from the manager.

The method may further include providing a manager with state information of the user terminals collected from the user terminals.

The providing may include visualizing at least one of play states, battery states, connection states, and temperature states of the user terminals.

The providing of the manager with the state information may include visualizing state information to be enlarged, the state information corresponding to a user terminal selected from the plurality of user terminals in response to an input from the manager.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 9 through 13 illustrate interface screens provided by a management server according to an example embodiment;

DETAILED DESCRIPTION

Figure 1:
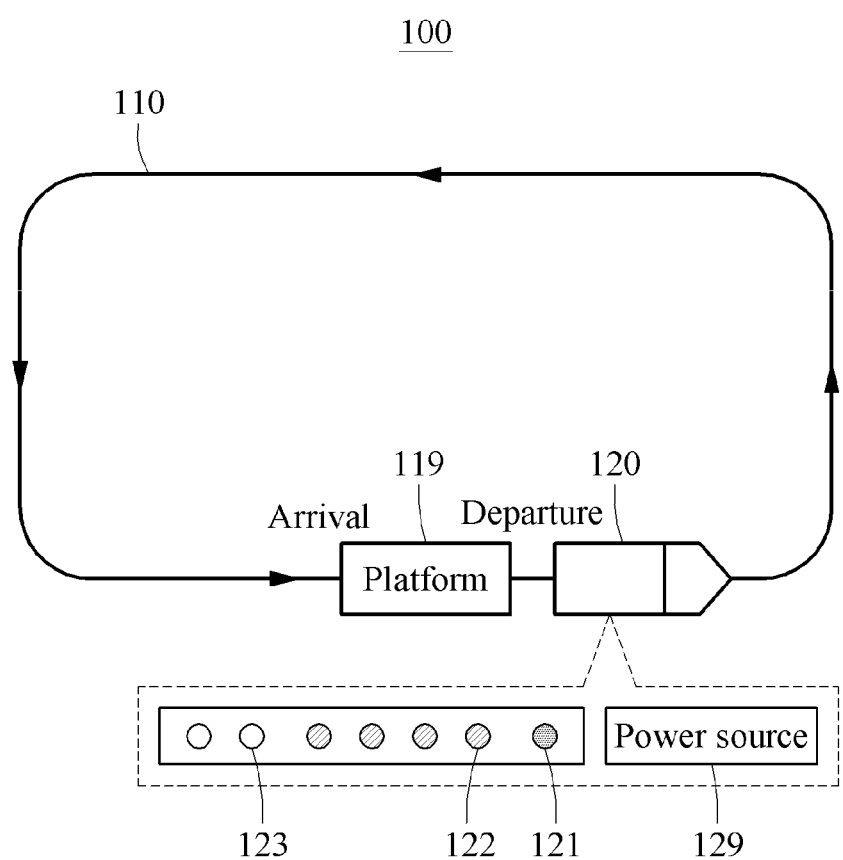
FIG. 1 illustrates a configuration of a ride system according to an example embodiment.

Hereinafter, some examples will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

FIG. 1 illustrates a configuration of a ride system according to an example embodiment.

An amusement park may have a plurality of attractions in a predetermined service space. The service space may be defined as a space in which a service is provided by a service provider, and the attractions may be facilities included in the service space. Each attraction may include various types of ride systems 100.

Referring to FIG. 1, a ride system 100 may include a ride 120 which moves along a predetermined track 110. The track 110 may also be referred to as a path. The ride 120 may move from a departure point of a platform 119 to an arrival point along the track 110. Although FIG. 1 illustrates the track 110 being a closed loop, example embodiments are not limited thereto. The platform 119 from which the ride 120 departs may differ from the platform 119 at which the ride 120 arrives. The platform 119 may be a place or a facility where a user rides on the ride 120.

Further, FIG. 1 illustrates only a single ride 120 for ease of description. However, example embodiments are not limited thereto. The ride system 100 may include a plurality of rides 120. The plurality of rides 120 may travel concurrently or sequentially.

The ride 120 may include a plurality of slots. Each slot may correspond to a physical boarding space which a user is on, or a device space in which a device for providing the user with a service is mounted, and may include a reference slot 121, a virtual reality (VR) slot 122, and a normal slot 123. The VR slot 122 may provide VR to a user in the slot. A user terminal for providing VR may be placed in a space corresponding to the VR slot 122. The normal slot 123 may simply provide only a space which a user may ride in. The reference slot 121 may be a slot in which a reference terminal is installed or mounted to provide reference direction information to a user terminal worn by the user riding in the VR slot 122. However the slots are provided as a simple example, and types and the number of slots may vary depending on a design.

Further, the ride 120 may also include a power source 129 (for example, a locomotive) which enables the ride 120 to move along the track 110.

Hereinafter, the configuration of the ride system 100 will be described further.

Figure 2:
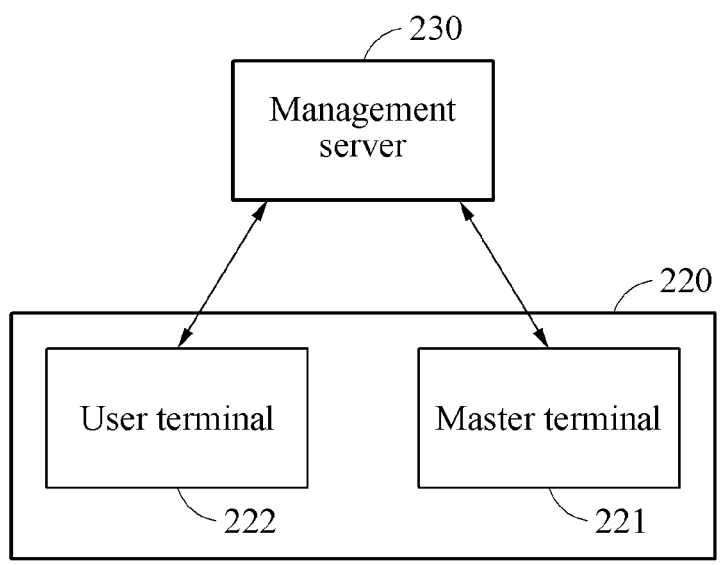
FIG. 2 illustrates a user terminal, a master terminal, and a management server in a ride system according to an example embodiment.

FIG. 2 illustrates a user terminal, a master terminal, and a management server in a ride system according to an example embodiment.

Referring to FIG. 2, a ride system 200 may include a ride 220 and a management server 230.

A plurality of user terminals may be mounted on the ride 220. The user terminals may be implemented, for example, as a head mounted device (HMD) which may be worn on a head of a user. The user terminal 222 worn on the head of the user may provide a contents image to the user by visualizing the contents image. For example, the user terminal 222 may extract a field of view (FOV) image corresponding to a sight direction of the user from the contents image, and provide the extracted FOV image to the user. The user terminal 222 may provide the FOV image in a form of a stereoscopic image, and the stereoscopic image may include a left image and a right image having a disparity. The user terminal 222 may enable the user to stereoscopically recognize the FOV image by providing the left image to a left eye of the user and the right image to a right eye of the user.

The contents image may include VR contents. However, example embodiments are not limited thereto. The contents image may also include mixed reality (MR) contents and augmented reality (AR) contents. For example, when the user terminal provides the user with AR contents, the user terminal may visualize, on a display, an external scene captured through a camera sensor disposed parallel with the sight direction of the user, and visualize an AR object to overlay the visualized external scene, together with visualizing the external scene. Overlaying may be an operation of generating and visualizing a graphical object to occlude at least a portion of the external scene (for example, a background scene). When the user terminal provides MR contents, the user terminal may transmit rays corresponding to the external scene through a transmissive display. The user terminal may visualize the MR object on the transmissive display. Thus, the user may recognize the external scene and the MR object combined thereto together. The external scene may be, for example, a scene corresponding to an FOV range of the user terminal and an FOV range of the user in an environment existing in a forward direction of the user terminal or the user wearing the user terminal.

For reference, among user terminals, a user terminal 222 in which a master mode is activated may be referred to as a master device 221. Activation of the master mode will be described below with reference to FIG. 7. The master terminal 221 may provide reference direction information, for example, information related to a moving direction of the ride 220, to another user terminal 222 in which the master mode is deactivated. The user terminal 222 providing the user with the contents image may be a user terminal 222 in which the master mode is deactivated.

The master terminal 221 may be fixed to the ride 220. The master terminal 221 may detect the moving direction of the ride 220 through a direction detection sensor while being fixed to the ride 220. The master terminal 221 may provide the detected moving direction of the ride 220 as the reference direction information to the user terminal 222.

The user terminal 222 and the master terminal 221 may build communication with each other via the management server 230. For example, the user terminal 222 and the master terminal 221 may build communication with the management server 230. The user terminal 222 and the master terminal 221 may respectively transmit the detected sight direction and the detected moving direction to each other via the management server 230. The user terminal 222 and the master terminal 221 may each report state information thereof to the management server 230. The management server 230 may provide a manager with the state information of each user terminal 222 and the master terminal 221, and control the user terminals in response to an input from the manager. An operation of the management server 230 will be described below with reference to FIG. 8.

Further, the user terminal 222 and the master terminal 221 are not limited to building communication with each other only through the management server 230. The user terminal 222 and the master terminal 221 may build direct communication therebetween. For example, the user terminal 222 and the master terminal 221 may establish wireless communication (for example, Wi-Fi, or Bluetooth) therebetween. For example, the user terminal 222 may transmit a sight direction of the user detected through an acceleration sensor to the master terminal 221. The master terminal 221 may transmit a moving direction of the ride 220 detected through an acceleration sensor to the user terminal 222.

The user terminal 222 may determine an FOV image to be provided to the user from the contents image based on the moving direction of the ride 220 and the sight direction of the user. However, example embodiments are not limited thereto. The master terminal 221 or the management server 230 may determine the FOV image, and provide the determined FOV image to the user terminal 222. In this example, the master terminal 221 or the management server 230 may stream a plurality of frame images constituting the FOV image to the user terminal 222 through wired or wireless communication. Further, the master terminal 221 and the management server 230 may calculate only an FOV range of the user, and provide data related to the FOV range to the user terminal 222.

Hereinafter, an operation of the user terminal 222 will be described with reference to FIG. 3. For reference, herein, the user terminal 222 may also be referred to as an image visualizing device.

Figure 3:
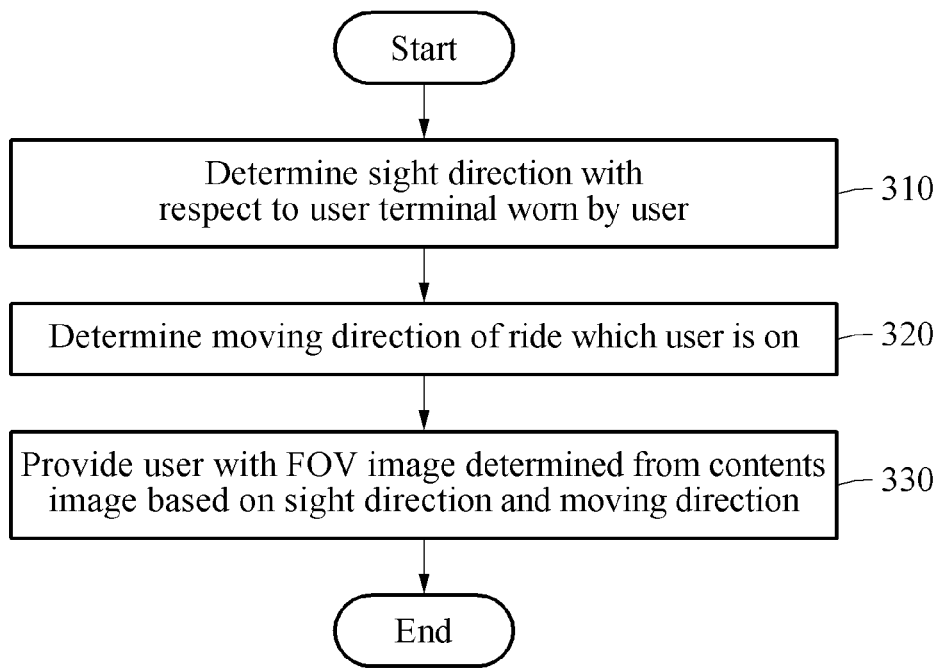
FIG. 3 illustrates a method of visualizing an image of a ride operation according to an example embodiment.

FIG. 3 illustrates a method of visualizing an image of a ride operation according to an example embodiment.

In operation 310, a user terminal may determine a sight direction with respect to a user terminal worn by a user. The sight direction may be a direction viewed by the user wearing the user terminal. A relationship between the sight direction and other directions will be described below with reference to FIG. 4. A user terminal in which a master mode is deactivated may detect the sight direction through a direction detection sensor. The user terminal may transmit the sight direction to a master terminal and a management server.

In operation 320, the user terminal may determine a moving direction of a ride which the user is on. The moving direction may be a direction in which the ride proceeds to move along a track. A relationship between the moving direction and other directions will be described below with reference to FIG. 4. A user terminal in which the master mode is activated (for example, the master terminal) may detect the moving direction through the direction detection sensor. The terminal in which the master mode is deactivated may receive the moving direction from the master terminal, thereby determining the moving direction of a ride associated with the user terminal (for example, the ride on which the user terminal is mounted).

In operation 330, the user terminal may provide the user with an FOV image determined from the contents image based on the sight direction and the moving direction. Herein, the contents image may be an image including VR-associated contents. The contents image may be a video image including a plurality of frame images. However, example embodiments are not limited thereto. The contents image may be a still image including a single image. When the sight direction of the user changes, the user terminal may need to provide the user with an FOV image corresponding to a new sight direction. Thus, the contents image may have an FOV wider than an FOV of the user.

The user terminal may change the FOV range of the user in response to a change in at least one of the sight direction and the moving direction. The user terminal may provide the user with the FOV image corresponding to the new FOV range, thereby dynamically reflecting a change in sight caused by a motion of the user (for example, an action of turning a head) and a movement of the user (for example, a movement of the ride). Thus, the user terminal may realistically provide VR contents included in the contents image to the user.

Further, when the contents image is a video image including a plurality of frame images, the user terminal may provide the frame images consecutively and sequentially to the user over time. The frame images of the video image may be associated with a progress of operating time of the ride, and the user terminal may provide more realistic VR experience to the user as the ride operates.

Figure 4:
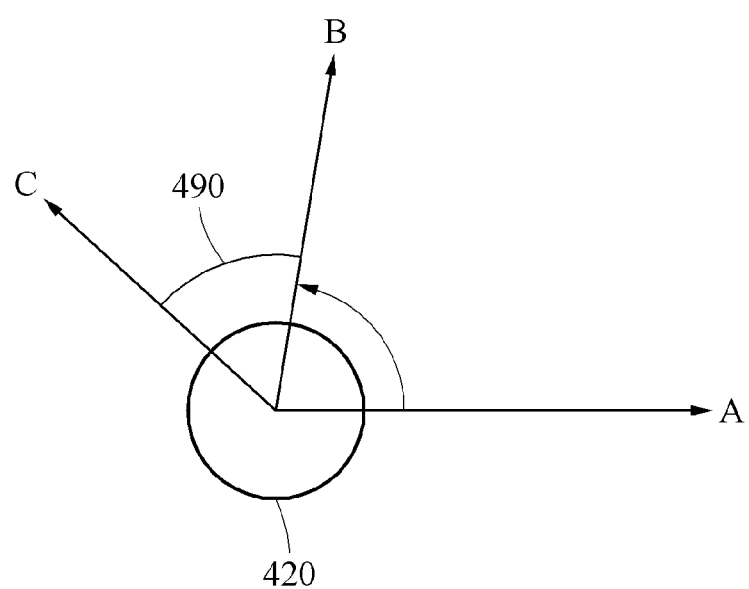
FIG. 4 illustrates an initial direction, a moving direction of a ride, and a sight direction of a user terminal detected by the user terminal during an operation of a ride according to an example embodiment.

FIG. 4 illustrates an initial direction, a moving direction of a ride, and a sight direction of a user terminal detected by the user terminal during an operation of a ride according to an example embodiment.

A user terminal 420 may detect and store an initial direction A before a ride departs. For example, the user terminal 420 may store direction data detected at a time of departure of the ride, the direction data detected by a direction detection sensor which detects at least one of a sight direction C and a moving direction B. The direction data detected at the time of departure may be the initial direction A. The user terminal 420 may calibrate the direction detection sensor based on the stored direction data. A master terminal may detect an initial moving direction A1 at the time of departure, and the user terminal 420 may detect an initial sight direction A2 at the time of departure. The user terminal 420 and the master terminal may match the initial moving direction A1 and the initial sight direction A2, thereby calibrating the direction detection sensor. The initial moving direction A1 and the initial sight direction A2 matched may be integrally represented as the initial direction A.

For example, the user terminal 420 may determine the moving direction B of the ride while the ride travels along a path, for example, a track. As described with reference to FIG. 3, the user terminal 420 in which a master mode is deactivated may receive the moving direction B detected by the master terminal from the master terminal. The user terminal 420 may subtract the initial direction A from the moving direction B, thereby calibrating the direction detection sensor. A direction value obtained by subtracting the initial direction A from the moving direction B may be referred to as a corrected moving direction (for example, B−A). The user terminal 420 may arrange a contents image based on the moving direction B or the corrected moving direction (for example, B−A) and provide the arranged contents image. The arrangement of the contents image will be described below with reference to FIGS. 5A and 5B.

The user terminal 420 may determine a sight direction C of the user while the ride travels along the path. As described with reference to FIG. 3, the user terminal 420 in which a master mode is deactivated may detect the sight direction C through the direction detection sensor. The user terminal 420 may calculate a final gaze direction of the user based on a direction difference 490 between the sight direction C and the moving direction B. The user terminal 420 may determine an FOV image corresponding to the final gaze direction calculated from the arranged contents image.

For reference, FIG. 4 illustrates the initial direction A, the moving direction B, and the sight direction C forming angles on a two-dimensional plane for ease of description. However, example embodiments are not limited thereto. Each of the directions may have a three-dimensional vector component, and the user terminal may correct the moving direction B in a three-dimensional space based on the initial direction A, and calculate a three-dimensional direction difference 490 between the sight direction C and the moving direction B. Herein, a direction may be expressed by a three-dimensional vector. However, example embodiments are not limited thereto. For reference, herein, A, A1, A2, B, and C may be direction vectors indicating directions with respect to the direction detection sensor which is a starting point. B−A may indicate a vector obtained by subtracting the vector A from the vector B. C−(B−A) may indicate a vector obtained by subtracting the vector (B−A) from the vector C.

Hereinafter, an example of arranging a contents image and providing an FOV image based on the initial direction A, the moving direction B, and the sight direction C will be described with reference to FIGS. 5A and 5B.

Figure 5A:
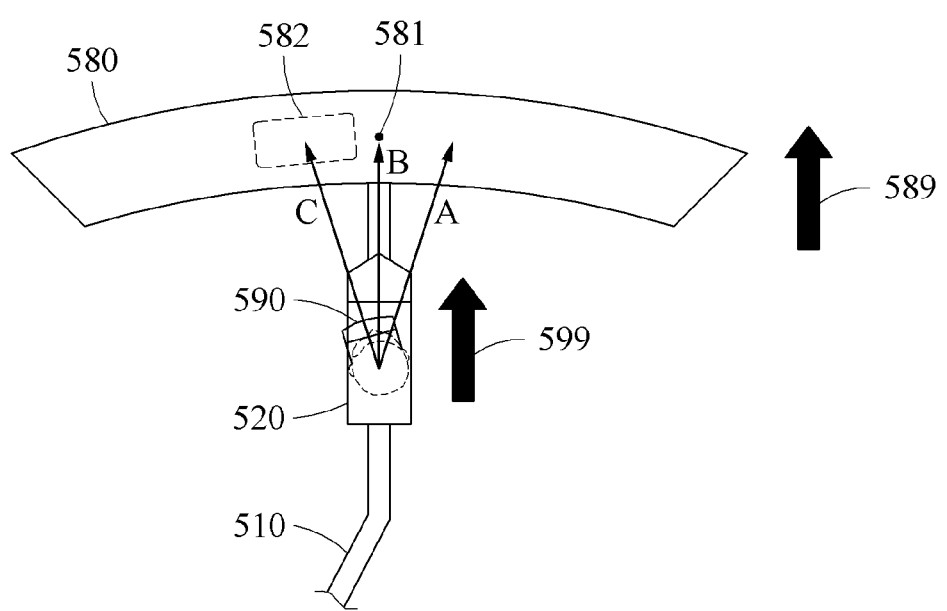
FIGS. 5A and 5B illustrate an operation of providing a realistic contents image to a user based on a moving direction of a ride detected according to an example embodiment.
Figure 5B:
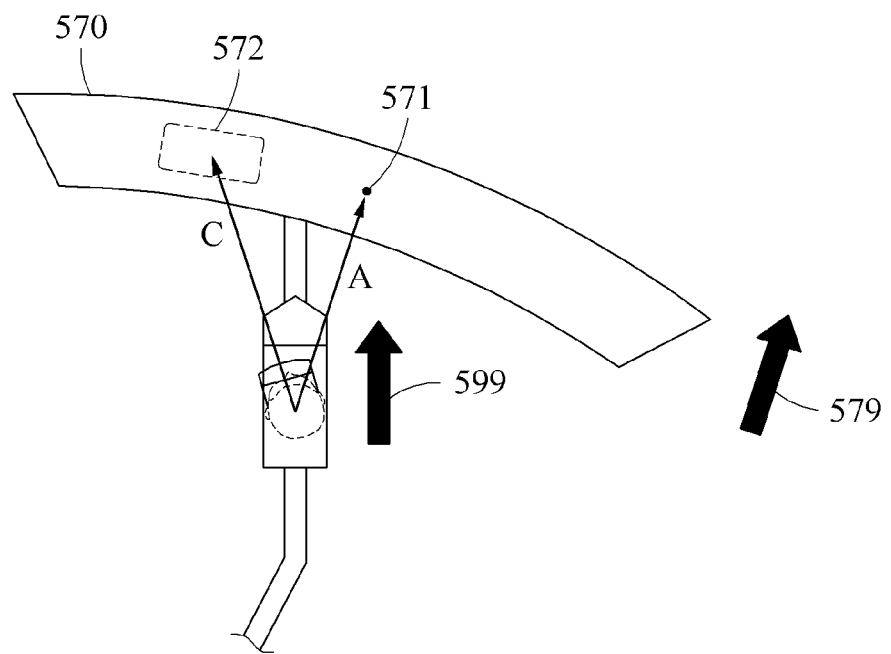

FIGS. 5A and 5B illustrate an operation of providing a realistic contents image to a user based on a moving direction of a ride detected according to an example embodiment.

Referring to FIG. 5A, an example in which a user terminal 590 provides a user with a contents image 580 by utilizing the moving direction B. For example, the user terminal 590 may arrange the contents image 580 based on the moving direction B. The user terminal 590 may match a reference point 581 of the contents image 580 to the moving direction B, as shown in FIG. 5A.

Herein, the contents image 580 may include contents generated such that a direction of a viewpoint and a direction in which the viewpoint moves match, and the reference point 581 of the contents image 580 may correspond to a viewpoint. For example, it may be assumed that the contents image 580 is an image generated by capturing a wide FOV image using a predetermined camera which moves. In this example, the contents image 580 may be a video image. A center point in an FOV of the camera may correspond to the viewpoint, and an optical axis direction of the camera may correspond to the direction of the viewpoint. A direction in which the camera moves may correspond to the direction in which the viewpoint moves. That is, the contents image 580 may be an image captured using the camera which moves while facing the front. However, the contents image 580 is not limited thereto. The contents image 580 may be an image generated through a graphical task performed by a contents producer. In this example, the contents image 580 may be an image in which a direction of a viewpoint intended by the contents producer and a direction in which the viewpoint moves match. The direction in which the viewpoint moves may also be referred to as a progress direction 589 of the contents.

The user terminal 590 may match the moving direction B of a ride 520 and the reference point 581 of the contents, thereby matching a progress direction 599 of a body that the user may feel and the progress direction 589 of the contents. Thus, the user terminal 590 may provide a user on the ride 520 with more realistic VR experience through integration of the progress direction 589 of the contents provided through the user terminal 590 and the actual progress direction 599 (for example, the moving direction B) of the body of the user. The moving direction B may correspond to a track 510 along which the ride 520 moves.

Then, the user terminal 590 may determine an FOV image 582 corresponding to the direction difference between the sight direction C and the moving direction B from the arranged contents image 580. For reference, the user terminal 590 may extract the FOV image 582 from the contents image 580 such that the center point of the FOV image 582 matches the sight direction. For example, the user terminal 590 may determine a final sight direction (for example, C−(B−A)) by subtracting the corrected moving direction (for example, B−A) from the sight direction C. The user terminal 590 may extract an FOV image with the final sight direction (for example, C−(B−A)) as a center from the contents image 580 matched based on the moving direction B. Thus, the user terminal 590 may change the FOV image 582 naturally in response to a movement of a head of the user while providing the contents in the progress direction integrated with the moving direction B of the ride 520. The user terminal 590 may visualize the determined FOV image 582. For example, the user terminal 590 may output the FOV image 582 through a display.

The FOV image 582 may be an image corresponding to an FOV range to be provided by the user terminal to the user in the contents image 580. The FOV range may be determined based on a range that the user may recognize, a size of the display of the user terminal, and a resolution of the display.

Conversely, FIG. 5b illustrates a situation in which a moving direction of a ride is not considered. If the moving direction of the ride is not provided, the user terminal may have to match the initial direction A or the sight direction C to a reference point 571 of a contents image 570. FIG. 5B illustrates the situation in which the reference point 571 of the contents image 570 is matched to the initial direction A. In this example, a progress direction 579 of the contents image 570 may not match the actual progress direction 599 of the body of the user. The user terminal may provide the user with an FOV image 572 corresponding to the sight direction C, and the user may feel dizzy due to the mismatch between the progress direction 579 of the contents image 570 and the actual progress direction 599 of the body of the user. This may also apply in a similar manner when the reference point 571 of the contents image 570 is matched to the sight direction C.

Thus, according to example embodiments, an image visualizing device (for example, the user terminal 590) may provide the contents image 580 based on the moving direction B, as described with reference to FIG. 5A, thereby providing the user with optimal VR experience.

Figure 6:
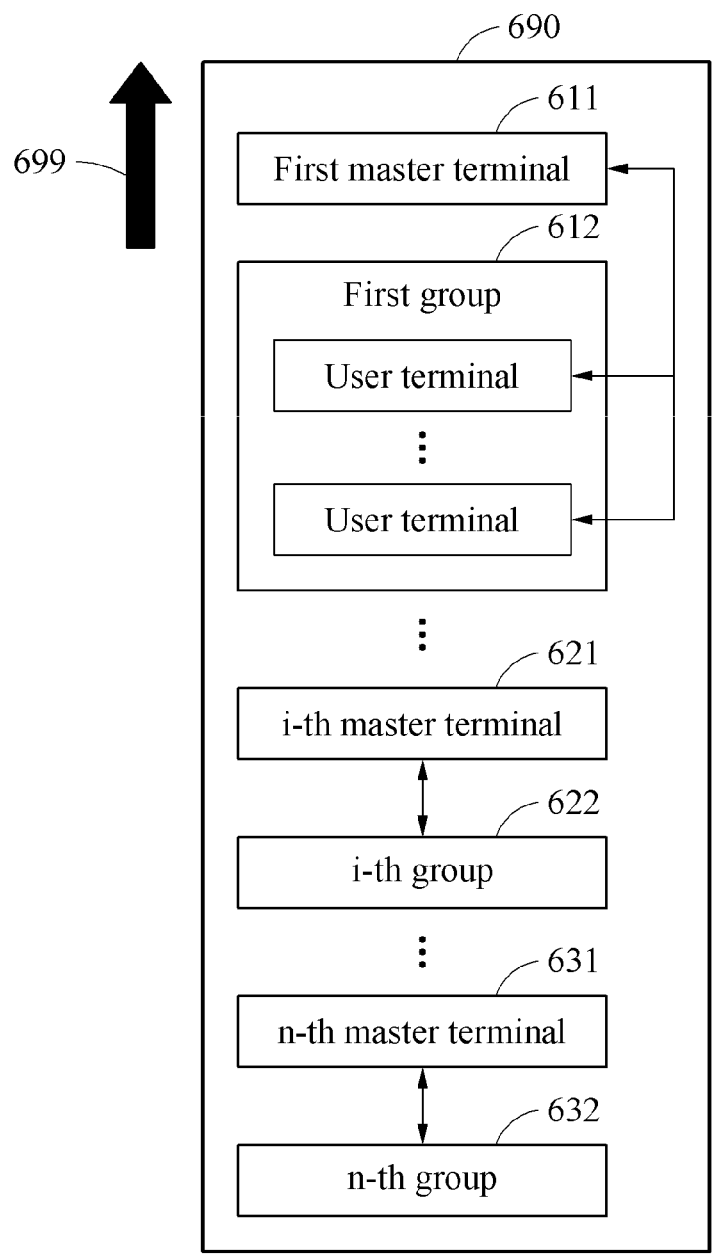
FIG. 6 illustrates a configuration of classifying user terminals into groups corresponding to respective master terminals, when the plurality of master terminals is designated in a ride according to an example embodiment.

FIG. 6 illustrates a configuration of classifying user terminals into groups corresponding to respective master terminals, when the plurality of master terminals is designated in a ride according to an example embodiment.

In a ride 690 which moves in a progress direction 699 corresponding to a track, a plurality of user terminals may be classified into one or more groups. For example, FIG. 6 illustrates an example in which the plurality of user terminals associated with the ride 690 is classified into n groups. Here, n may be an integer greater than or equal to "1". A corresponding master terminal may be assigned to each of the plurality of groups.

For example, a first master terminal 611 may be assigned to user terminals belonging to a first group 612, and an n-th master terminal 631 may be assigned to user terminals belonging to an n-th group 632. In general terms, an i-th master terminal 621 may be assigned to user terminals belonging to an i-th group 622. The number of user terminals in each group may be the same. However, example embodiments are note limited thereto. The number of user terminals in each group may differ depending on a design. For example, the i-th master terminal 621 may detect a moving direction of a portion of the ride 690 on which the i-th master terminal 621 is mounted, and share the detected moving direction to the user terminals belonging to the i-th group 622. For example, a target user terminal among the plurality of user terminals may receive the moving direction from another user terminal designated with respect to a group of the target user terminal, among other user terminals in which a master mode is activated.

When the ride 690 includes a plurality of vehicles connected to each other, a system of the ride 690 may detect a moving direction for each group and provide user terminals with the detected moving direction, thereby providing a more accurate moving direction to individual users. For example, when the ride 690 includes n vehicles, a master terminal may be mounted on each of the n vehicles. The master terminal mounted on each vehicle may transmit the same moving direction to user terminals of users on the corresponding vehicle.

Figure 7:
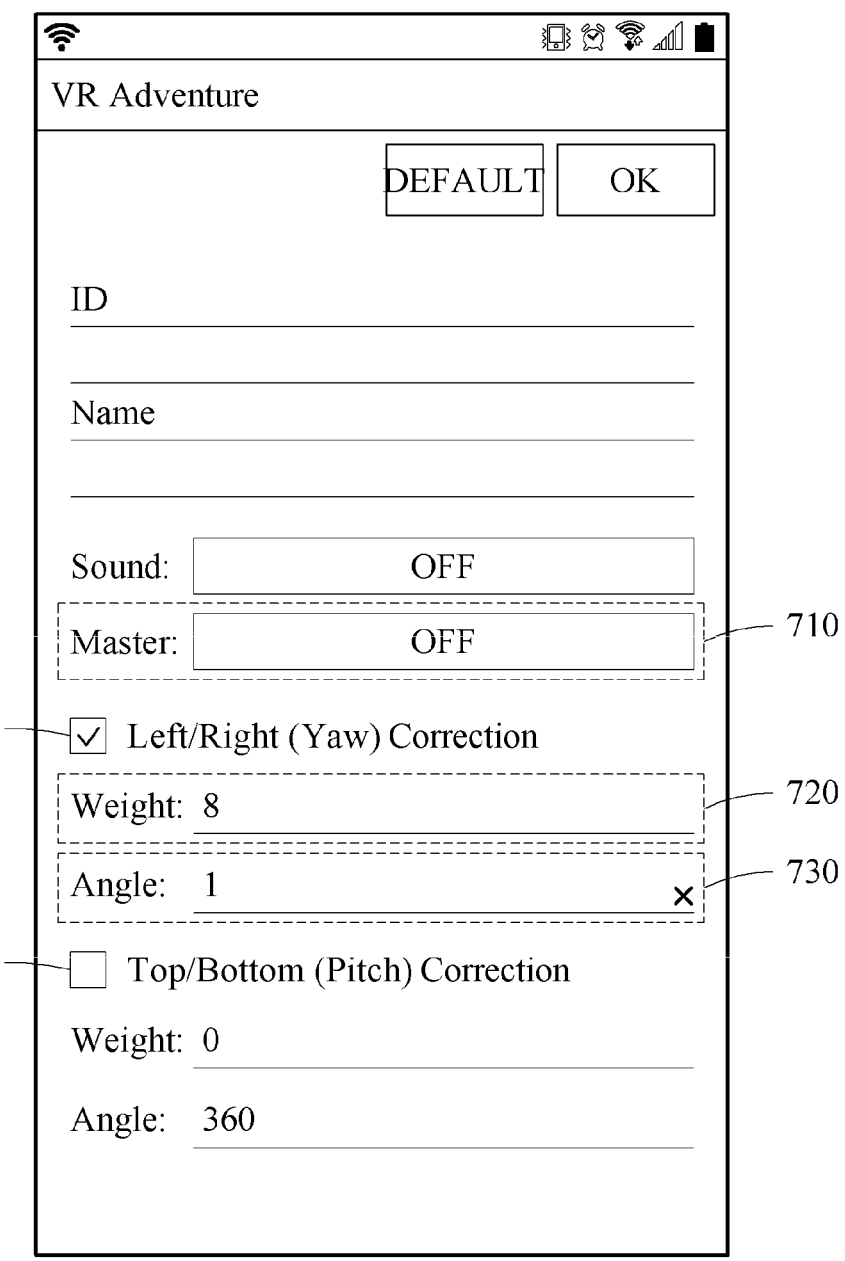
FIG. 7 illustrates mode settings, weight settings, and screen update frequency settings of a user terminal according to an example embodiment.

FIG. 7 illustrates mode settings, weight settings, and screen update frequency settings of a user terminal according to an example embodiment.

A user terminal may activate or deactivate a master mode, in response to a mode setting input. The mode setting input may be an input of selecting and executing a master mode setting object, for example, a touch input. However, the mode setting input is not limited thereto. The user terminal may basically deactivate the master mode, and activate the master mode or maintain the deactivated state in response to the mode setting input only when a contents image is played.

For example, the user terminal may detect a moving direction through a direction detection sensor, in response to the master mode being activated in the user terminal. The user terminal may transmit the detected moving direction to another user terminal in which the master mode is deactivated.

In another example, the user terminal may detect a sight direction through the direction detection sensor, in response to the master mode being deactivated in the user terminal. In this example, the user terminal may receive the moving direction from another user terminal in which the master mode is activated.

The user terminal may set a speed for reflecting a viewpoint change in an FOV image provided by the user terminal to the user, in response to a weight setting input. The weight setting input may be an input with respect to an object 720 for setting a weight. As described above, a reference viewpoint of the contents image may be matched to the moving direction, and a central point of the FOV image may be matched to a final gaze direction determined based on the moving direction and the sight direction. Thus, the viewpoint change in the FOV image may be caused by a direction change in the sight direction or the moving direction. The user terminal may gradually apply a variation of the direction to the final gaze direction of the user based on a preset weight, in response to a change in at least one of the sight direction and the moving direction. The user terminal may provide the user with an FOV image corresponding to the variation-applied final gaze direction. For example, the user terminal may reflect a partial variation of the viewpoint at an initial time at which the viewpoint changes and gradually decrease the variation to be reflected based on a weight over time, such that the reflection of the viewpoint change is completed for a preset viewpoint change time (for example, for m seconds or for k frames). Here, m may be a real number, and k may be an integer greater than or equal to "1". The user terminal may greatly adjust an FOV range at the beginning at which the viewpoint changes, and slightly adjust the FOV range as time passes. Thus, the user terminal may gently change the FOV image.

In the example of FIG. 7, "8" may be input as a weight, which may indicate that 80% of a total variation of a viewpoint is to be reflected for each frame. For example, the user terminal may adjust an FOV image provided to the user in the contents image by reflecting 80% of the total variation of the viewpoint in a first frame immediately after the viewpoint changes. In a subsequent frame, the user terminal may adjust the FOV image by reflecting 80% of the remaining 20% variation, for example, 16% of the total variation of the viewpoint. When the weight decreases, the user terminal may more gently switch the FOV image when a viewpoint changes.

Further, the user terminal may determine a frequency for applying, by the user terminal, a change in the moving direction to calculation of the final gaze direction, in response to an update frequency setting input. The update frequency setting input may be, for example, an input with respect to an object 730 for setting a threshold angle change. For example, the user terminal may update the final gaze direction, in response to the variation of the moving direction exceeding the threshold angle change. In the example of FIG. 7, the threshold angle change may be set as "1" degree. The user terminal may correct the final gaze direction each time the moving direction of the ride changes "1" degree.

The weight and the threshold angle change may be set only with respect to one of a plurality of rotation axes. In the example of FIG. 7, a correction 741 with respect to a yaw axis may be activated in relation to the weight and the threshold angle change. The yaw axis may be an axis on which the user terminal rotates to the left or right based on the ground. In another example, a correction 742 with respect to a pitch axis may be activated in relation to the weight and the threshold angle change. The pitch axis may be an axis on which the user terminal rotates upward or downward based on the ground. The user terminal may set the weight and the threshold angle change only with respect to one of the two rotation axes, thereby providing a user with a normal VR image.

Figure 8:
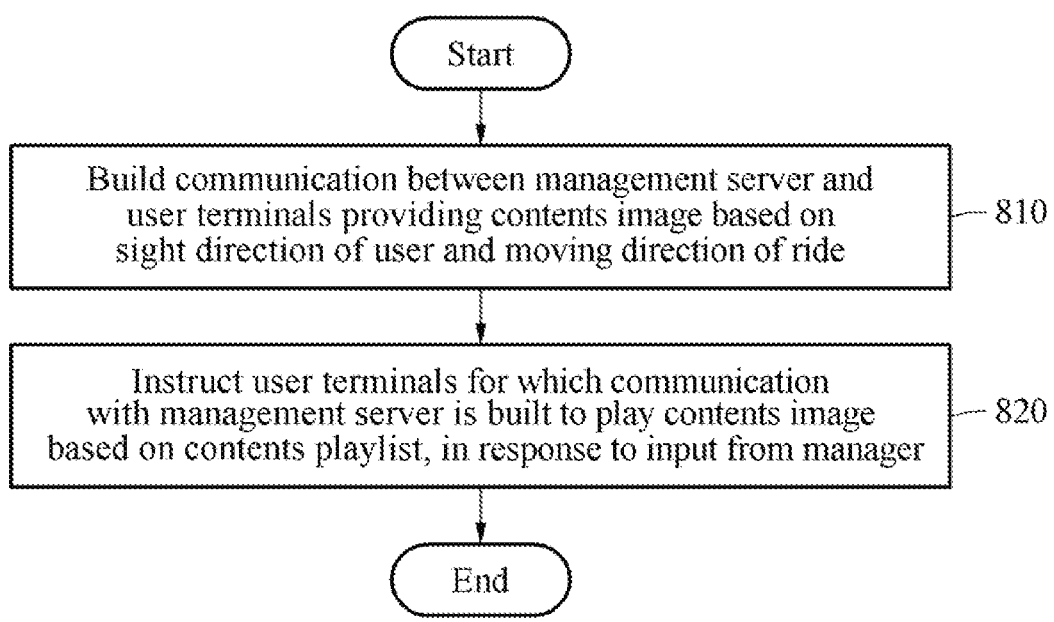
FIG. 8 illustrates a method of managing an image visualizing device according to an example embodiment.

FIG. 8 illustrates a method of managing an image visualizing device according to an example embodiment.

Referring to FIG. 8, in operation 810, a management server may build communication between a management server and user terminals providing a contents image based on a sight direction of a user and a moving direction of a ride. For example, the management server may build wired or wireless communication with the user terminals described with reference to FIGS. 1 through 7. The management server may transmit or receive a moving direction, a sight direction, a contents image, an FOV image, and a variety of information associated with provision of the contents image to the user terminals or from the user terminals through the built communication.

In operation 820, the management server may instruct the user terminals for which the communication with the management server is built to play the contents image based on a contents playlist, in response to an input from a manager. For example, the management server may transmit an instruction to play the contents image at the same time to user terminals associated with a ride, in response to an input from the user for operating the ride. In addition, the management server may instruct all the user terminals to play the same content image. However, example embodiments are not limited thereto. For example, the management server may instruct at least a portion of the user terminals to play a contents image different from that of a remaining portion of the user terminals, based on settings by a manager.

The management server may synchronize clocks of the user terminals. For example, the management server may transmit a time setting signal to the user terminals. The time setting signal may include information related to a time at which a corresponding signal is transmitted. The management server may synchronize operation clocks of user terminals receiving the time setting signal based on time information received from the user terminals. The time information received from the user terminals may include information related to a time at which a corresponding user terminal responds. The management server may instruct the user terminals to play the contents image when a preset time elapses after the synchronization is completed. For example, the management server may set each user terminal to play the contents image after a preset additional time $t_a$ elapses from a time T at which a play instruction is transmitted. The additional time $t_a$ may be set to be a time sufficiently greater than a time required for performing the synchronization.

Thus, the management server may synchronize screens and sounds to be provided to users. In addition, to calculate an accurate direction difference between the moving direction of the ride in each user terminal and the sight direction of the corresponding terminal, the management server may synchronize clocks of the master terminal and the user terminals.

In another example, the management server may receive the sight direction from each of the user terminals. The management server may receive the moving direction from a user terminal in which a master mode is activated, among the user terminals. The management server may determine a final gaze direction of the user with respect to each user terminal in which the master mode is deactivated, among the user terminals, based on the sight direction and the moving direction. The management server may provide the user terminal in which the master mode is deactivated, with an FOV image corresponding to the final gaze direction determined in the contents image. For example, the management server may stream each frame image of the FOV image to the user terminal.

FIGS. 9 through 13 illustrate interface screens provided by a management server according to an example embodiment.

Figure 9:
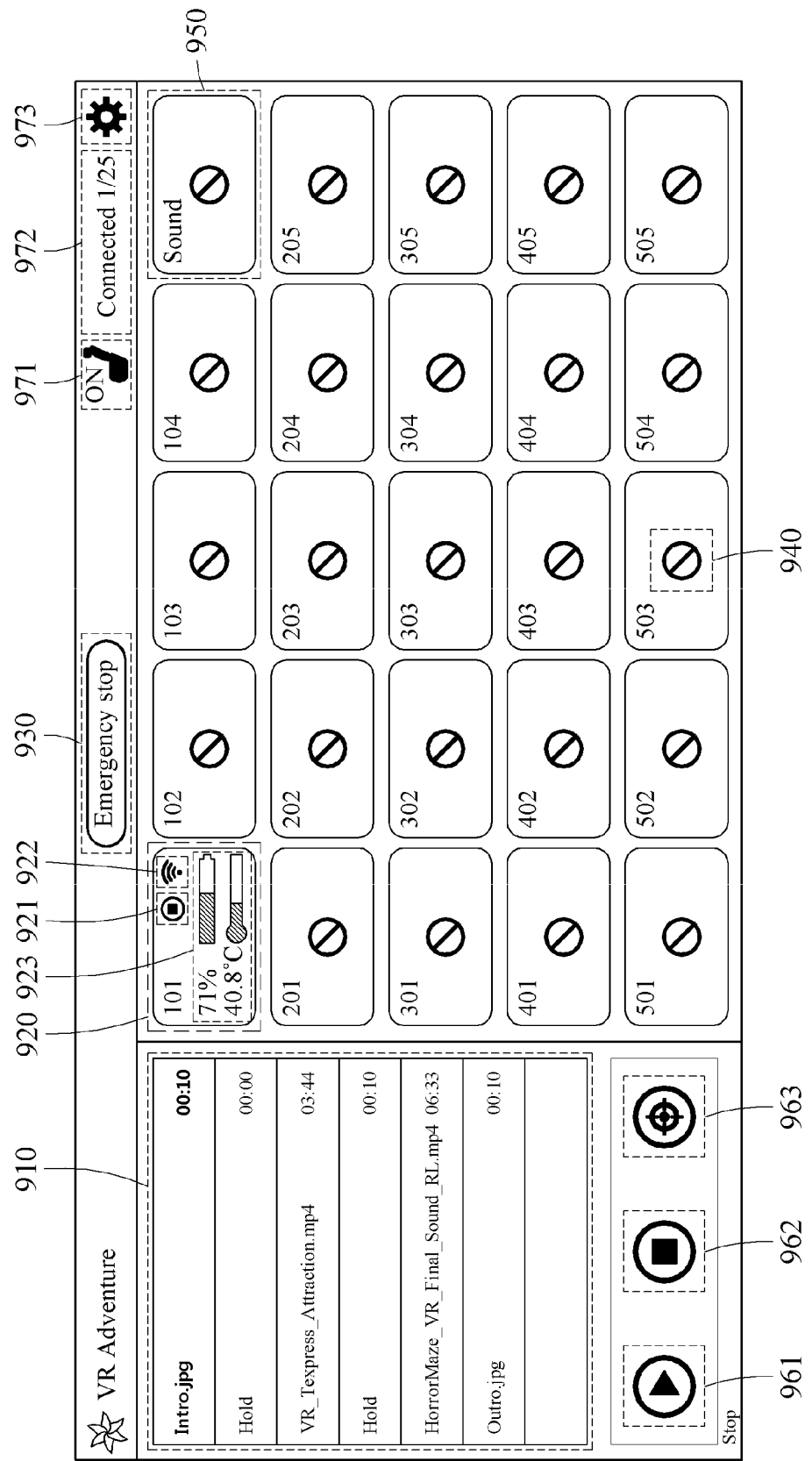

FIG. 9 illustrates a main interface screen provided by a management server to a manager.

Referring to FIG. 9, the management server may visualize a contents playlist 910. The management server may instruct a visualization of a contents image selected based on an event duration of a ride, among a plurality of contents images included in the contents playlist 910. An event of the ride may be, for example, an event that the ride moves along a track and a user terminal provides a contents image to a user. The event of the ride may be triggered by an event start instruction from the manager. For example, the contents playlist 910 may include the plurality of contents images, and the management server may sequentially play subsequent contents images in the contents playlist 910, when a playback of a predetermined contents image is terminated in response to an elapse of the event duration of the ride. The event duration may be a time elapsed after the event is triggered by the manager.

The management server may provide the manager with state information 920 of user terminals collected from the user terminals. The management server may receive and update the state information 920 from each user terminal at a predetermined interval (for example, at an interval of 200 ms). For example, the management server may visualize, as the state information 920, at least one of play states 921, battery states 923, connection states 922, and temperature states of the user terminals. The play states 921 may indicate whether a contents image is played, stopped, or downloaded by each user terminal. The battery states 923 may indicate residual power of batteries and temperatures of the batteries. The connection states 922 may indicate strengths of wireless communication connections when the user terminals and the management server are connected wirelessly.

The management server may provide the manager with an alert box in response to a temperature of a user terminal exceeding a threshold temperature. The management server may provide the manager with an alert to request replacement or charging of a battery of a user terminal, in response to a state of charge of the battery of the user terminal being less than a threshold state of charge.

The management server may provide the manager with an emergency stop button 930. In case of emergency, the manager may activate the emergency stop button 930 to stop the ride, and stop the contents image on user terminals associated with the ride all at once. In response to the emergency stop button 930 being activated, the management server may transmit an emergency instruction to each user terminal such that each user terminal may play an emergency sound (for example, an emergency bell sound) and an emergency image.

When a connection with respect to a user terminal associated with a predetermined slot, among a plurality of slots of the ride, is not built, the management server may visualize a disconnection state 940 for the manager. For example, FIG. 9 illustrates an example in which the ride has 25 slots, and only a user terminal associated with a 101-th slot is connected.

A sound output-only device may be mounted on one of the plurality of slots of the ride. The management server may provide the manager with information 950 related to the sound output-only device. The sound output-only device may output the same sound to a plurality of users all at once.

The management server may provide the manager with a play button 961, a stop button 962, and a rearrangement button 963. The play button 961 may be an object for generating an instruction to play the contents playlist 910. The stop button 962 may be an object for generating an instruction to stop the contents image being played. For reference, the stop button 962 may be activated to be selected and executed by the manager when a contents image is played. The rearrangement button 963 may be an object for setting, for all user terminals, a sight direction that is currently viewed by each user terminal to be a forward direction. The manager may rearrange a direction detection sensor of each user terminal by activating the rearrangement button 963, at a time of operating the ride, for example, in a state in which the user terminal is placed in a slop of the ride before the user terminal is worn. However, example embodiments are not limited thereto. Even when a rearrangement input is not provided by the manager, the management server may automatically rearrange a direction of each user terminal when the ride operates.

The management server may display a connection state 971 of a motion chair that may tilt a body of the user in a slot in which the user terminal is placed. The management server may also visualize the number 972 of user terminals currently connected to the server. In addition, the management server may also provide the manager with a button 973 to move to a server settings page.

The management server may stop an operation of the user terminal in response to a disconnection from the user terminal. Further, the management server may detect whether the user terminal is stolen. For example, the management server may provide the manager with a theft alarm in response to the user terminal being away from a predetermined geographical area (for example, an area assigned to an attraction in a service space). Thus, the management server may prevent the user terminal from being stolen.

Figure 10:
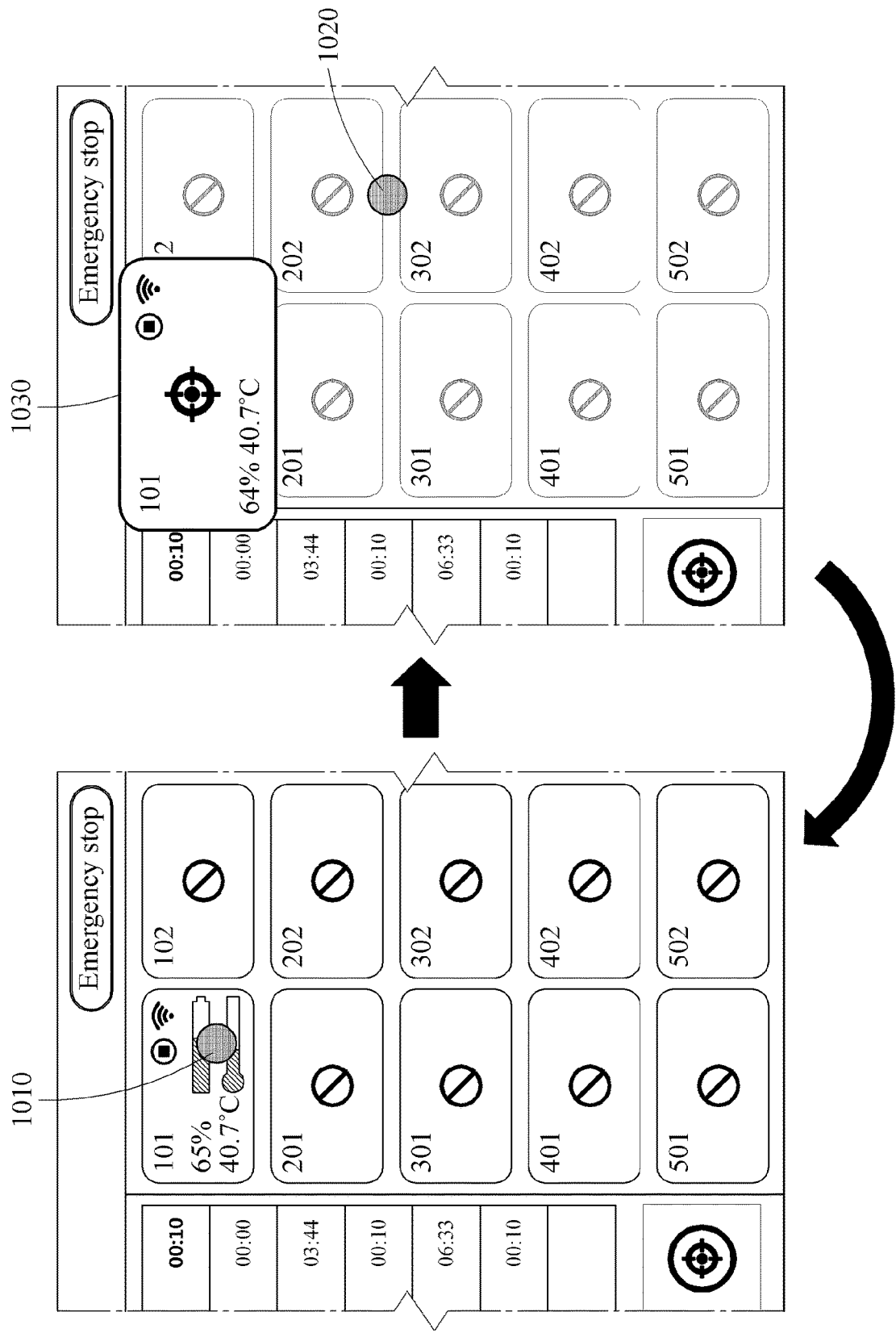

In the example of FIG. 10, the management server may enlarge state information corresponding to a user terminal selected in response to an input 1010 from a manager, among a plurality of user terminals. The manager may more conveniently verify a state of a desired user terminal through a state box 1030 being enlarged. Then, the management server may return to an initial interface in response to an input 1020 with respect to an area other than the enlarged state box 1030.

Figure 11:
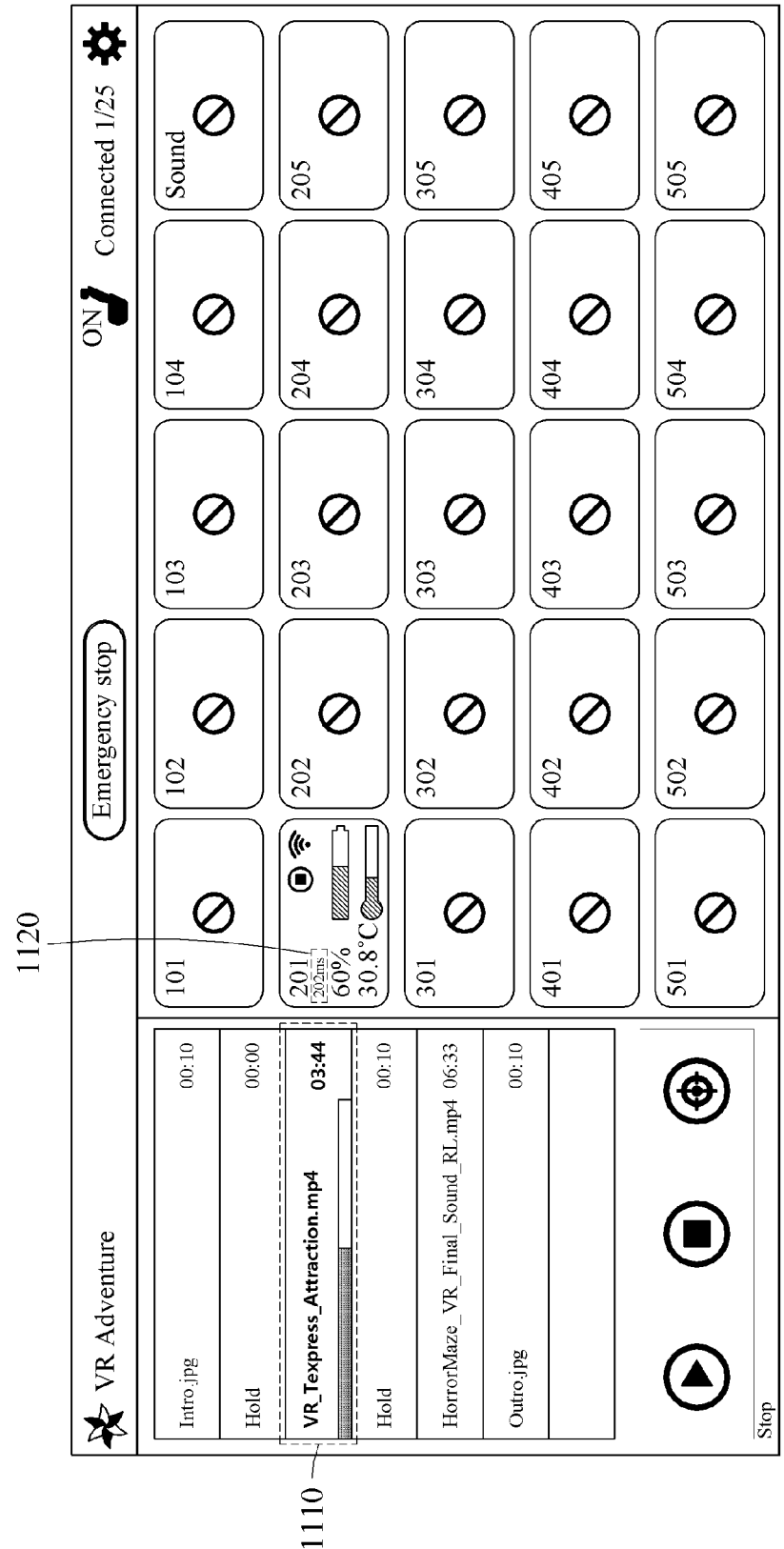

In the example of FIG. 11, the management server may visualize a graphical object 1110 relating to a progress of a currently played contents image in a contents playlist. Thus, the manager may intuitively verify a progress of a playback of the contents image as an event duration of the ride elapses. Further, the management server may also provide a delay time 1120 of each user terminal.

Figure 12:
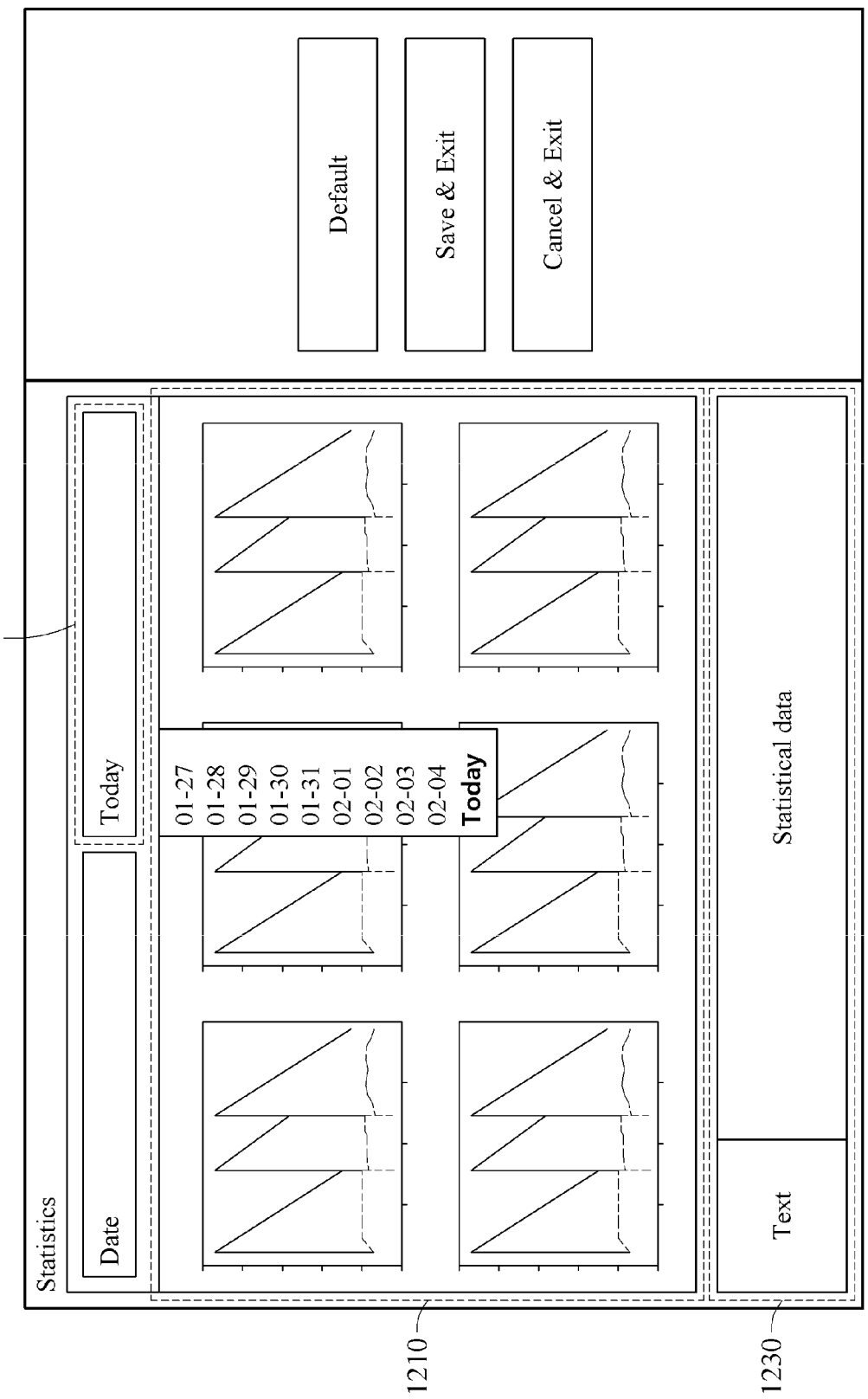

In the example of FIG. 12, the management server may visualize a graphical object 1210 associated with statistics and provide the manager with statistical data 1230. The graphical object 1210 associated with statistics may indicate a change in state of charge of a battery of each user terminal. The management server may provide statistical information with respect to a date 1220 selected by the manager.

In the example of FIG. 13, the management server may provide the manager with an interface to edit a contents playlist. For example, the management server may provide the manager with an object 1310 for designating a type of each contents image, and an object 1320 for editing a contents image. The management server may change at least one of an order of contents images included in the contents playlist, a visualization scheme, a length of time, a volume, and the number of contents images, in response to an input from the manager with respect to the corresponding object. The visualization scheme of contents images may include a scheme of visualizing a still image for a predetermined time, a scheme of two-dimensionally visualizing a video image, and a scheme of visualizing a three-dimensional image by generating a left image and a right image from an image. The management server may add a contents image to the contents playlist, or remove a contents image from the contents playlist, in response to an input from the manager.

Figure 14:
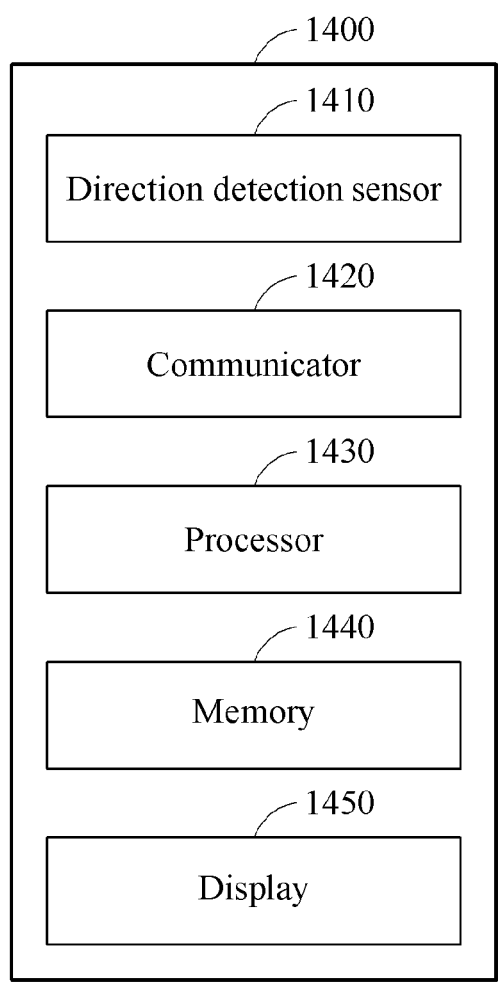
FIG. 14 illustrates a configuration of a user terminal according to an example embodiment.

FIG. 14 illustrates a configuration of a user terminal according to an example embodiment.

Referring to FIG. 14, a user terminal 1400 may include a direction detection sensor 1410, a communicator 1420, a processor 1430, a memory 1440, and a display 1450. The user terminal 1400 may operate as a master terminal when a master mode is activated therein.

The direction detection sensor 1410 may detect a sight direction with respect to the user terminal 1400 worn by a user. In the master mode, the direction detection sensor 1410 may detect a moving direction of a ride which the user is on. The direction detection sensor 1410 may be, for example, an acceleration sensor. However, example embodiments are not limited thereto.

The communicator 1420 may build communication with another user terminal 1400 and a management server. The communicator 1420 may transmit or receive the moving direction, the sight direction, a contents image, and an FOV image to or from the other user terminal 1400 and the management server. The communicator 1420 may perform wired communication or wireless communication.

The processor 1430 may determine the sight direction with respect to the user terminal 1400 worn by the user and the moving direction of the ride which the user is on. The processor 1430 may control the display 1450 to visualize a contents image for the user. An operation of the processor 1430 is not limited thereto. The processor 1430 may perform at least a portion of the operations described with reference to FIGS. 1 through 7.

The memory 1440 may temporarily or permanently store data required for visualizing an image while the ride operates. For example, the memory 1440 may accumulatively store the moving direction and the sight direction detected by the user terminal 1400 in a chronological order.

The display 1450 may provide the user with an FOV image determined based on the sight direction and the moving direction from the contents image. For example, the display 1450 may output the determined FOV image based on a control of the processor 1430. When the display 1450 includes a stereoscopic screen, the display 1450 may provide a left image to a left eye of the user and provide a right image to a right eye of the user. Further, the display 1450 may include a transmissive screen.

Figure 15:
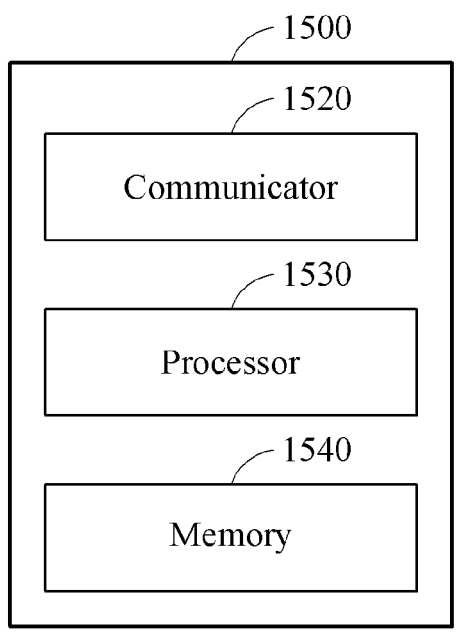
FIG. 15 illustrates a configuration of a management server according to an example embodiment.

FIG. 15 illustrates a configuration of a management server according to an example embodiment.

Referring to FIG. 15, a management server 1500 may include a communicator 1520, a processor 1530, and a memory 1540.

The communicator 1520 may build communication with user terminals. For example, the communicator 1520 may collect state information from the user terminals, and transmit an instruction generated based on an input from a manager to the user terminals. Further, the communicator 1520 may transmit or stream a contents image stored in the management server 1500 to the user terminals.

The processor 1530 may instruct user terminals for which the communication with the management server 1500 is built to play a contents image based on a contents playlist, in response to an input from the manager. For example, the processor 1530 may instruct the user terminal to play a subsequent contents image each time an event duration of a ride exceeds a running time of each contents image, based on a play order designated in the contents playlist. However, an operation of the processor 1530 is not limited thereto. The processor 1530 may perform at least a portion of the operations described with reference to FIGS. 8 through 13.

The memory 1540 may temporarily or permanently store data required for managing an image visualizing device. For example, the memory 1540 may accumulatively store state information of user terminals collected through the communicator 1520 in a chronological order. The memory 1540 may store statistical information with respect to the state information, and a contents image to be provided to the user terminals.

Figure 16:
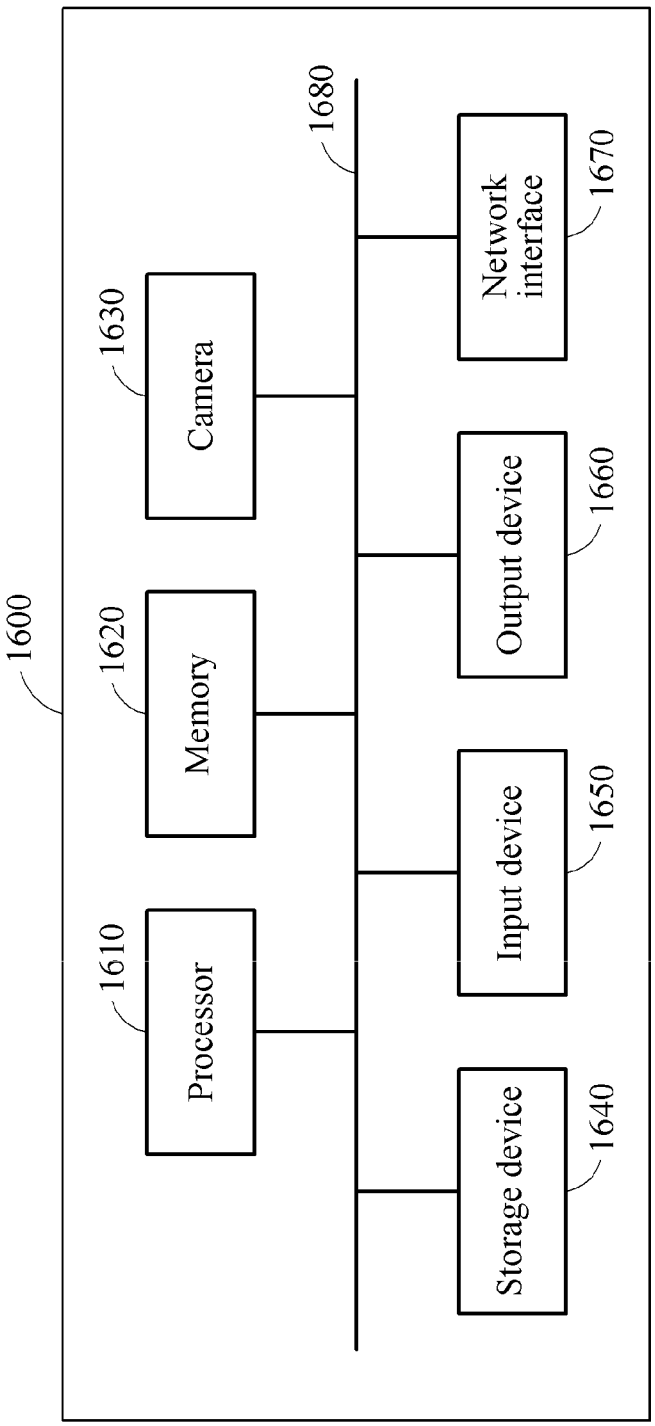
FIG. 16 illustrates a configuration of a computing device according to an example embodiment.

FIG. 16 illustrates a configuration of a computing device according to an example embodiment.

A computing device 1600 may be the user terminal or the management server which is described above. The computing device 1600 may correspond to the user terminal 1400 of FIG. 14. The computing device 1600 may be, for example, an image processing device, a smart phone, a wearable device, or a tablet computer. The computing device 1600 may include functions identical to those of the user terminal 1400 of FIG. 14. In another example, the computing device 1600 may include functions identical to those of the management server 1500 of FIG. 15.

Referring to FIG. 16, the computing device 1600 may include a processor 1610, a memory 1620, a camera 1630, a storage device 1640, an input device 1650, an output device 1660, and a network interface 1670. The processor 1610, the memory 1620, the camera 1630, the input device 1650, the output device 1660, and the network interface 1670 may communicate with each other through a communication bus 1680.

The processor 1610 may execute instructions and functions to be executed in the computing device 1600. For example, the processor 1610 may process instructions stored in the memory 1620. The processor 1610 may perform the at least one operation described with reference to FIGS. 1 through 15.

The memory 1620 may store information or data required for execution of the processor 1610. The memory 1620 may include a computer-readable storage medium or a computer-readable memory. The memory 1620 may store instructions to be executed by the processor 1610, and store related information while an application or software is executed by the computing device 1600. In addition, the computing device 1600 may further include the additional storage device 1640.

The camera 1630 may capture an image including a plurality of image frames. For example, the camera 1630 may capture an external scene with respect to an outside of the computing device 1600.

The input device 1650 may receive an input from a user through a tactile, video, audio, or touch input. The input device 1650 may include, for example, a keyboard, a mouse, a touch screen, a microphone, or another predetermined device that may detect the input from the user and transmit the detected input to the computing device 1600.

The output device 1660 may provide an output of the computing device 1600 to the user through a visual, auditory, or tactile channel. The output device 1660 may include, for example, a display, a touch screen, a speaker, a vibration generator, or another predetermined device that may provide the output to the user. The network interface 1670 may communicate with an external device through a wired or wireless network.

According to example embodiments, a user terminal may provide a user with a contents image in view of both a sight direction of the user and a moving direction of a ride, thereby preventing dizziness that the user may feel during VR experience and providing the user with more realistic VR.

According to example embodiments, a user terminal may adjust a speed and a frequency of applying a change in a final gaze direction depending on settings, thereby providing a user with more natural and realistic VR.

According to example embodiments, by setting a user terminal with the same specification as a normal terminal which provides a VR image to a user or as a master terminal to be mounted on a ride, as necessary, through master mode settings, costs may be reduced.

According to example embodiments, a master terminal installed on each ride including a plurality of vehicles may provide a moving direction to user terminals designated as the same group, thereby providing more accurate moving direction information to the user terminals associated with each vehicle.

According to example embodiments, a management server may collect and visualize state information of user terminals, thereby improving the intuitiveness and the convenience of ride management by a manager.

According to example embodiments, a management server may manage playing operations of user terminals all at once, thereby enabling a manager to quickly manage an unexpected situation.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of visualizing an image during an operation of a ride, the method comprising:
    determining a sight direction with respect to a user terminal worn by a user;
    determining a moving direction of a ride which the user is on; and
    providing the user with a field of view (FOV) image determined from a contents image based on the sight direction and the moving direction, and
    wherein the determining of the moving direction comprises:
    detecting the moving direction through a direction detection sensor, in response to a master mode being activated in the user terminal; and
    transmitting the detected moving direction to another user terminal in which the master mode is deactivated.

2. The method of claim 1, wherein the providing comprises:
    arranging the contents image based on the moving direction;
    determining the FOV image corresponding to a direction difference between the sight direction and the moving direction from the arranged contents image; and
    visualizing the determined FOV image.

3. The method of claim 2, wherein the arranging comprises matching a reference point of the contents image to the moving direction.

4. The method of claim 2, wherein the determining of the FOV image comprises:
    calculating a final gaze direction of the user based on the direction difference between the sight direction and the moving direction; and
    determining the FOV image corresponding to the calculated final gaze direction from the arranged contents image.

5. The method of claim 1, further comprising:
    storing direction data detected at a time of departure of the ride, by a direction detection sensor configured to detect at least one of the sight direction and the moving direction; and
    calibrating the direction detection sensor based on the stored direction data.

6. The method of claim 1, wherein the determining of the sight direction comprises detecting the sight direction through a direction detection sensor, in response to a master mode being deactivated in the user terminal, and
    the determining of the moving direction comprises receiving the moving direction from another user terminal in which the master mode is activated.

7. The method of claim 1, wherein a plurality of user terminals is classified into one or more groups, and the determining of the moving direction comprises receiving, by a target user terminal among the plurality of user terminals, the moving direction from another user terminal designated for a group of the target user terminal, among user terminals in which a master mode is activated.

8. The method of claim 1, wherein the providing comprises:

gradually applying a variation in at least one of the sight direction and the moving direction to a final gaze direction of the user based on a preset weight, in response to a change in the at least one direction; and providing the user with the FOV image corresponding to the final gaze direction to which the variation is applied.

9. The method of claim 1, wherein the providing comprises updating a final gaze direction, in response to a variation in the moving direction exceeding a threshold angle change.

10. A non-transitory computer-readable storage medium storing instructions that, when executed by a processor, cause the processor to perform the method of claim 1.

11. A user terminal for visualizing an image during an operation of a ride, the user terminal comprising:

a processor configured to determine a sight direction with respect to a user terminal worn by a user and a moving direction of a ride which the user is on;

a display configured to provide the user with a field of view (FOV) image determined from a contents image based on the sight direction and the moving direction;

a direction detection sensor configured to detect the moving direction in response to a master mode being activated in the user terminal; and a communicator configured to transmit the detected moving direction to another user terminal in which the master mode is deactivated.

12. A method of managing an image visualizing device associated with a ride, the method comprising:

building communication between a management server and user terminals providing a contents image based on a sight direction of a user and a moving direction of a ride; and instructing the user terminals for which the communication with the management server is built to play the contents image based on a contents playlist, in response to an input from a manager, and wherein the instructing comprises:

receiving the sight direction from each of the user terminals;

receiving the moving direction from a user terminal in which a master mode is activated, among the user terminals;

determining a final gaze direction of a user with respect to each user terminal in which the master mode is deactivated, among the user terminals, based on the sight direction and the moving direction; and providing the user terminal in which the master mode is deactivated with a field of view (FOV) image corresponding to the determined final gaze direction in the contents image.

13. The method of claim 12, wherein the instructing comprises:

transmitting a time setting signal to the user terminals;

synchronizing operation clocks of user terminals receiving the time setting signal based on time information received from the user terminals; and instructing the user terminals to play the contents image when a preset time elapses after the synchronization is completed.

14. The method of claim 12, wherein the instructing comprises instructing the user terminals to visualize a contents image selected from a plurality of contents images included in the contents playlist based on an event duration of the ride.

15. The method of claim 12, further comprising:

changing at least one of an order of contents images included in the contents playlist, a visualizing scheme, a length of time, a volume, and the number of contents images, in response to an input from the manager.

16. The method of claim 12, further comprising:

providing a manager with state information of the user terminals collected from the user terminals.

17. The method of claim 16, wherein the providing comprises visualizing at least one of play states, battery states, connection states, and temperature states of the user terminals.

18. The method of claim 16, wherein the providing of the manager with the state information comprises visualizing state information to be enlarged, the state information corresponding to a user terminal selected from the plurality of user terminals in response to an input from the manager.

* * * * *